Oct. 30, 1951 — M. R. EHRENSTEIN — 2,573,417
NORDESOXYCORTICOSTERONE ESTERS
Filed May 8, 1948
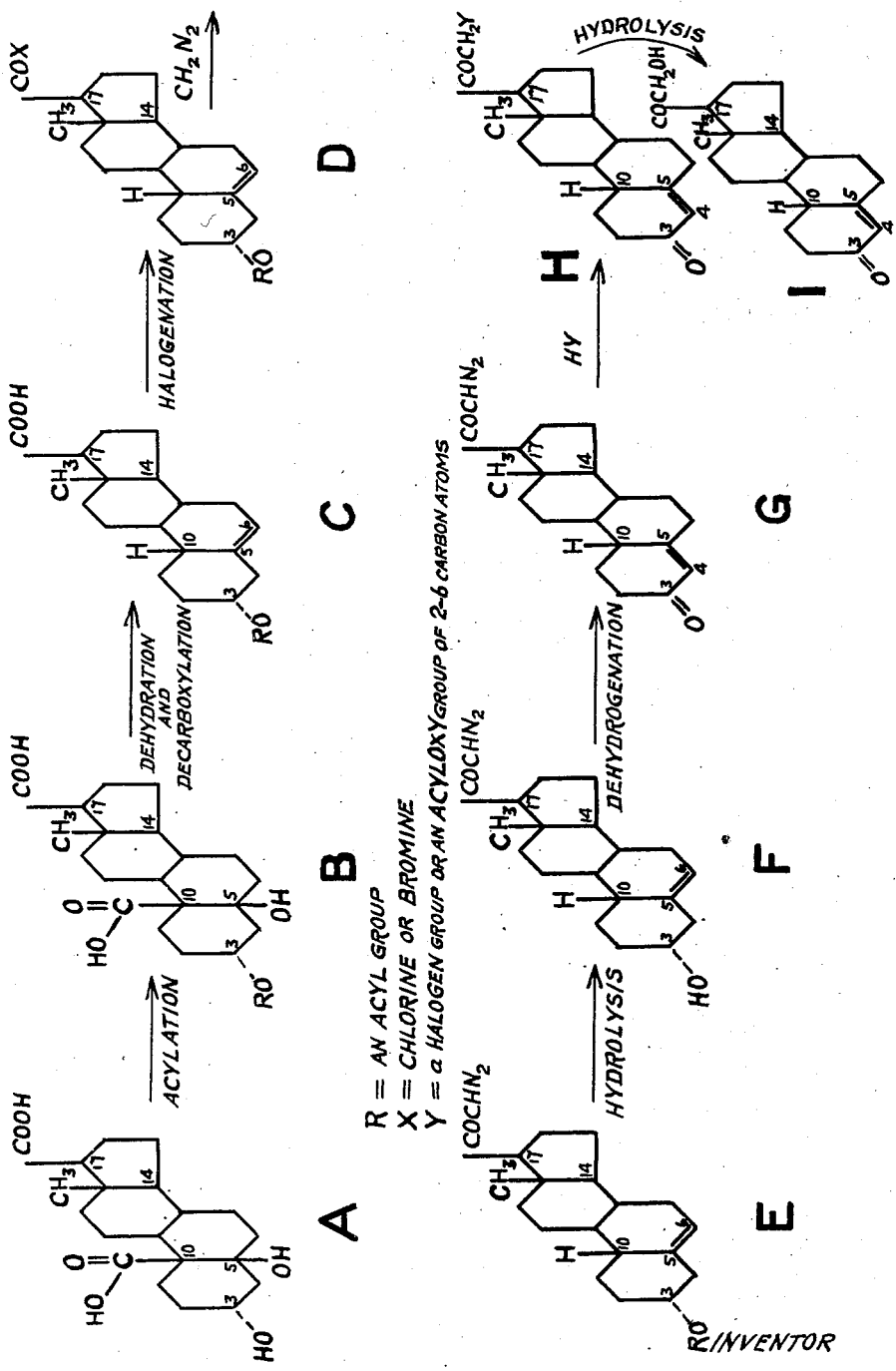
INVENTOR
Maximilian R. Ehrenstein Patented Oct. 30, 1951

2,573,417

UNITED STATES PATENT OFFICE 2,573,417

NORDESOXYCORTICOSTERONE ESTERS

Maximilian R. Ehrenstein, Philadelphia, Pa., assignor to The Trustees of the University of Pennsylvania, Philadelphia, Pa., a corporation of Pennsylvania Application May 8, 1948, Serial No. 25,824

6 Claims. (Cl. 260—397.4)

This invention relates to certain new chemical compounds believed variously to have physiological activity and variously to have value as intermediates and method for their production.

More specifically, the new chemical compounds contemplated by this invention will include the new compound 10-nor-11-desoxycorticosterone acetate and various intermediates, which are produced in the course of its preparation by the method according to this invention.

The new compound, 10-nor-11-desoxycorticosterone acetate, have been found to have physiological activity. The various other new compounds and intermediates formed in the course of preparation thereof and of 10-nor-11-desoxycorticosterone acetate and the corresponding alcohol will find utility as intermediates and will have physiological activity.

The particular structure of the new compound, 10-nor-11-desoxycorticosterone acetate, and the structure of the novel compounds comprising intermediates formed in the preparation of 10-nor-11-desoxycorticosterone acetate, and the procedure according to the method of this invention is illustrated in the scheme shown in the accompanying drawing, with reference to which the nature of the several novel compounds and the details of the method will be described.

In the scheme:

The formulae illustrates the structures of 10-norprogesterone and of the several intermediates formed in the course of its preparation and the several steps of the method according to this invention are broadly indicated.

In the scheme the starting material or compound is indicated at A. This material, a saturated dicarboxylic acid having the formula $C_{20}H_{30}O_6$ (estrane-3,5-diol-10,17-dicarboxylic acid), has heretofore been prepared and is described, for example, by Butenandt and Gallagher, Ber. 72, p. 1866 (1939); Chem. Abst. 34, p. 773 (1940).

Proceeding now according to the method of this invention, as indicated in the scheme, the compound B is formed by acylation of the starting compound A to protect the hydroxyl group at carbon atom 3. The acylation of the compound A is, for example, effected by treatment with an acid anhydride, as, for example, acetic anhydride, propionic anhydride, or other suitable anhydride which will protect the hydroxyl group at carbon atom 3.

As exemplifying the procedure for acylation of the compound A, using acetic anhydride, anhydride, a solution of 0.450 g. of recrystallized estrane -3,5-diol-10,17-dicarboxylic acid in 4.5 cc. of acetic anhydride is refluxed (metal-bath, 140–150° C.) for 30 minutes, after which 4.5 cc. of glacial acetic acid and 2.7 cc. of water are added to decompose anhydrides and the solution then heated on a water bath for about one hour. On completion of the heating the solvent is removed in vacuo (50° C.) and the sirupy residue taken up in ether and the solution extracted twice with ice cold dilute sodium carbonate. The combined extracts are acidified by adding without delay ice cold dilute hydrochloric acid which will cause a white flocculent precipitate to appear. The suspension is then extracted three times with ether and the combined ether extracts washed several times with small quantities of water. After drying and filtering, evaporation of the ether yields a product, usually obtained as a foamy, colorless glass. This product, which comprises the compound B, is then, for analysis, dried at 85° C. under slight vacuum in order to avoid possible decomposition and analyzes as follows:

Calculated for $C_{22}H_{32}O_7$ (monoacetate): C, 64.66; H, 7.90. Found: C, 64.20; H, 7.36.

Proceeding now from the compound B to the compound C, which, for example, may be 3-acetoxy - 10 - noretiocholenic acid (3-acetoxy-estrene-17-carboxylic acid), the compound B is subjected to heating in a high vacuum to effect dehydration and decarboxylation of the compound B. Preferably the compound B will be subjected to distillation in a high vacuum.

As exemplifying the procedure for the preparation of compound C from the compound B, where the compound B is, for example, an acetate, 0.590 g. of the crude compound B is transferred into a high vacuum retort by means of ether. After careful removal of the solvent, a foamy glass remains, which, on gentle heating in a high vacuum to a temperature of 80–120° C., is almost completely liquefied or sintered. The material thus obtained, essentially free from solvent, is subjected to distillation in a high vacuum. In effecting the distillation the temperature is raised fairly quickly to about 180° C. where gas evolution will be observed. Subsequently, the temperature is raised slowly, say within a period of about one hour, to 250° C. and then quickly raised to about 290° C. and the distillation thereafter interrupted. The distillate, usually a slightly yellow, brittle glass, is subjected to another distillation under practically identical conditions, it being noted that in the redistillation there is no notable gas evolution. The product usually is a slightly yellow, brittle glass and gives a strong positive reaction with tetranitromethane. Analysis shows the following:

Calculated for $C_{21}H_{30}O_4$: C, 72.78; H, 8.73. Found: C, 73.36, 72.78; H, 8.30, 8.51.

Titration: 11.2 mg. of the product required 3.31 cc. of 0.01 N NaOH; calculated for monocarboxylic acid $C_{21}H_{30}O_4$; 3.23 cc.

In this product as illustrated in the scheme the double bond may be in the 5,6 position, in the 5,10 position, or in the 4,5 position, or the product may be a mixture of any two or all of these isomers hereinafter indicated by reference to "and/or isomers." However, no attempt was made to separate these isomers.

Proceeding now for the preparation of the compound D, which, for example, may be 3-acetoxy-10-noretiocholenic acid chloride (3-acetoxy-estrene-17-carboxylic acid chloride) and/or isomers, the compound C is directly transformed into the corresponding acid chloride and/or isomers by means of, for example, thionyl chloride, phosphorous oxychloride or phosphorous pentachloride. It will be understood that the compound D may be prepared as an acid bromide by using an equivalent bromide in place of the aforementioned chlorides.

As exemplifying the procedure for the preparation of the compound D from the compound C, a purified, colorless thionyl chloride is prepared, for example, by distilling pure commercial thionyl chloride (Eastman), of a slightly yellow color, over quinoline and then over linseed oil. To 200 mg. of the compound C, and/or isomers, is added in a cold room 1.0 cc. of the purified thionyl chloride. The mixture is allowed to stand under anhydrous conditions in the cold room (about 2° C.) for a period of about 50 minutes and then at room temperature (20° C.) for about 3½ hours, which usually results in the formation of an olive green solution. The solution thus formed is brought to dryness in vacuo (40° C.) under anhydrous conditions. The residue is then dried overnight in a vacuum desiccator (P$_2$O$_5$, KOH)

The acid chloride, or the bromide, thus prepared serves for the production of the compound E, as, for example, 3-acetoxy-10-norpregnene-20-one and/or isomers.

The compound D, or related compounds indicated above, and/or isomers, is of value not only as an intermediate for the preparation of the novel compound 10-nor-11-desoxycorticosterone acetate according to the method of this invention, but likewise is useful for the preparation of the novel compound 10-norprogesterone.

Proceeding now for the preparation of the compound E, or of the related compounds indicated above and/or isomers, in particular 3-acetoxy-21-diazo-10-norpregnene-20-one, and/or isomers, the compound D, or related compounds indicated above and/or isomers, is subjected to treatment with diazomethane.

As exemplifying the procedure for the preparation of the compound E from the compound D, a solution of diazomethane in ether is prepared from 5.15 g. of nitrosomethylurea dried over pellets of pure potassium hydroxide and redistilled under anhydrous conditions. To 45 cc. of this solution, at a temperature of −5° C., is then added 5 cc. of an ethereal solution of the acid chloride (compound D), as obtained from 0.39 g. of the compound C (and/or isomers) as described above. The mixture, usually of a golden-yellow color, is allowed to stand in a cold room (about +2° C.) for about 7 hours, and then at room temperature (say, 30–33° C.) for about two days. Thereafter the mixture is concentrated to about one-third of its volume on a water bath, filtered and brought to dryness in vacuo and then further dried in a vacuum desiccator overnight. The product, compound E, and/or isomers, is usually an amber colored, viscous material.

For the preparation now of the compound F, 21-diazo-10-norpregnene-20-one-3-ol, and/or isomers, the compound E is subjected to hydrolysis on the alkaline side.

As exemplifying procedure for the preparation of the compound F from the compound E, to a solution of .52 g. of the compound E, as prepared above, in 29 cc. of methanol, is added a solution of 0.25 g. of potassium hydroxide in 0.3 cc. of water and 5 cc. of methanol, and the mixture allowed to stand at room temperature (say, 32° C.) for about six hours. Then 0.53 g. of potassium bicarbonate dissolved in 20 cc. of water is added to the solution and the solution then concentrated to a volume of 20 cc. in vacuo (say, 45° C.). The concentrated solution is then extracted three times with ample quantities of ether and the combined ether extracts are washed three times with water, dried with sodium sulfate, filtered, and brought to dryness. The residue comprising compound F is usually an amber colored foamy glass amounting to about 0.42 g.

The compound G, 21-diazo-10-norprogesterone (21-diazo-10-nor-4-pregnene-3,20-dione), is formed from the compound F by subjecting the compound F to dehydrogenation.

As exemplifying the procedure for the formation of the compound G from the compound F, a solution of 0.85 g. of aluminum tert.-butoxide (Eastman) in 35 cc. of dry benzene is separated by decantation from a trace of undissolved material. To this solution is added a solution of 0.33 g. of compound F in 10 cc. of dry acetone. The mixture is refluxed under anhydrous conditions on a water-bath for a period of ten hours during which time another 2 cc. of dry acetone is added. The mixture is allowed to stand at room temperature overnight and then a relatively large amount of redistilled ether is added and the mixture washed twice with a saturated solution of potassium sodium tartrate, twice with a dilute solution of sodium carbonate, and three times with water. After drying with sodium sulfate and filtering, the solvent is removed in vacuo (about 45° C.). The residue, usually an amber colored viscous resin, comprises the compound G in amount of about 0.35 g.

The compound H, 10-nor-11-desoxycorticosterone acetate, is formed from the compound G.

As exemplifying the procedure for the formation of the compound H from the compound G, 0.35 g. of 21-diazo-10-norprogesterone is dissolved in 5 cc. of anhydrous glacial acetic acid. The solution is heated at about 95° C. for about 15 minutes, then during 15 more minutes, the temperature is raised to about 120–125° C. where it is kept for 5 minutes. Thereafter the acetic acid is removed in vacuo (about 50° C.) and the residue obtained is taken up in a large amount of ether and the solution filtered. The ether phase is washed with a solution of N sodium bicarbonate and three times with water. Then, after drying with sodium sulfate and filtering, the ether is removed in vacuo. The residue, amounting to about 0.27 g., is usually a light brown resin and comprising the crude compound H, is purified by chromatographic adsorptions.

For the chromatographic adsorption of the crude material 0.27 g. of the material is dissolved in 20 cc. of benzene and 10 cc. of petroleum ether, and the solution filtered through a column of 11 g. of aluminum oxide (aluminum oxide anhydrous, standardized for chromatographic adsorption according to Brockmann E. Merck, Darmstadt). The original solution is passed through within two hours and the following eluates within 25 and 30 minutes each. The chromatographic fractionation is as follows:

*Chromatographic fractionation I*

| No. of Fraction | Solvent | Weight of Residue, mg. | Appearance of Residue |
|---|---|---|---|
| 1 | 20 cc. benzene+10 cc. petr. ether (original solution). | 21.4 | slightly yellow oil. |
| 2 | 20 cc. benzene+10 cc. petr. ether | 34.6 | yellow oil. |
| 3 | 25 cc. benzene+5 cc. petr. ether | 23.6 | slightly yellow resin. |
| 4 | 28 cc. benzene+2 cc. petr. ether | 16.4 | Do. |
| 5 | 30 cc. benzene | 8.5 | Do. |
| 6 | ----do---- | 5.7 | Do. |
| 7 | 25 cc. benzene+5 cc. ether | 23.7 | yellow resin. |
| 8 | 20 cc. benzene+10 cc. ether | 18.3 | Do. |
| 9 | 15 cc. benzene+15 cc. ether | 8.5 | Do. |
| 10 | 10 cc. benzene+20 cc. ether | 2.0 | colorless resin. |
| 11 | 5 cc. benzene+25 cc. ether | 1.1 | Do. |
| 12 | 30 cc. ether | 1.6 | Do. |
| 13 | ----do---- | 12.8 | yellow oil. |
| 14 | 25 cc. ether+5 cc. chloroform | 0.3 | colorless residue. |
| 15 | 15 cc. ether+15 cc. chloroform | 0.8 | Do. |
| 16 | 30 cc. chloroform | 7.2 | yellow resin. |
| 17 | 25 cc. chloroform+5 cc. methanol | 34.6 | whitish-brownish. |
| 18 | 30 cc. methanol | 13.1 | Do. |
| | Total | 234.2 | |

It is believed that the compound H, 10-nor-11-desoxycorticosterone acetate is present particularly in fractions 3-6, and in agreement with this assumption it was found that these fractions give a positive reaction with silver diammine.

In order to secure a further quantity of the compound H, the fractions 1 and 2 above combined (56.0 mg.) are subjected to rechromatographic adsorption in solution in a mixture of 5 cc. of benzene and 20 cc. of petroleum ether. The solution is filtered through a column of 3 g. of aluminum oxide (Brockmann), the original solution being passed through within about one hour and the following eluates within 15 to 20 minutes each, with the following results:

*Chromatographic fractionation II*

| No. of Fraction | Solvent | Weight of Residue, mg. | Appearance of Residue |
|---|---|---|---|
| 1 | 5 cc. benzene+20 cc. petr. ether (original solution). | 13.4 | colorless oil. |
| 2 | 5 cc. benzene+15 cc. petr. ether | 9.6 | Do. |
| 3 | 5 cc. benzene+10 cc. petr. ether | 4.9 | colorless grease. |
| 4 | 7.5 cc. benzene+7.5 cc. petr. ether | 3.2 | Do. |
| 5 | 7.5 cc. benzene+7.5 cc. petr. ether | 2.5 | Do. |
| 6 | 10 cc. benzene+5 cc. petr. ether | 2.8 | colorless resin. |
| 7 | 12 cc. benzene+3 cc. petr. ether | 2.7 | Do. |
| 8 | 14 cc. benzene+1 cc. petr. ether | 1.6 | Do. |
| 9 | 15 cc. benzene | 0.9 | Do. |
| 10 | ----do---- | 0.8 | colorless residue. |
| 11 | 10 cc. benzene+5 cc. ether | 1.1 | Do. |
| 12 | 30 cc. ether | 4.3 | slightly yellow oil. |
| 13 | 12 cc. ether+3 cc. methanol | 1.8 | whitish resin. |
| 14 | 15 cc. methanol | 4.4 | whitish yellow residue. |
| | Total | 54.0 | |

Further fractions 7-12 of the first chromatogram combined (54.3 mg.) are subjected to rechromatographic adsorption by filtering a solution thereof in 14 cc. of benzene and 6 cc. of petroleum ether through a column of 3 g. of aluminum oxide (Brockmann). The solution passed through within about two hours and the eluates within 15 to 20 minutes each, with the following results:

*Chromatographic fractionation III*

| No. of Fraction | Solvent | Weight of Residue, mg. | Appearance of Residue |
|---|---|---|---|
| 1 | 14 cc. benzene+6 cc. petr. ether (original solution). | 1.1 | colorless residue. |
| 2 | 14 cc. benzene+6 cc. petr. ether | 0.8 | Do. |
| 3 | 12 cc. benzene+3 cc. petr. ether | 1.2 | Do. |
| 4 | 14 cc. benzene+1 cc. petr. ether | 2.8 | colorless resin. |
| 5 | 15 cc. benzene | 3.5 | Do. |
| 6 | ----do---- | 3.0 | Do. |
| 7 | 11 cc. benzene+4 cc. ether | 8.5 | pale yellow resin. |
| 8 | 7 cc. benzene+8 cc. ether | 3.4 | Do. |
| 9 | 5 cc. benzene+10 cc. ether | 2.0 | colorless resin. |
| 10 | 30 cc. ether | 4.5 | Do. |
| 11 | 7.5 cc. ether+7.5 cc. chloroform | 1.6 | Do. |
| 12 | 15 cc. chloroform | 4.0 | yellow resin. |
| 13 | 12 cc. chloroform+3 cc. methanol | 10.0 | whitish-yellow resin. |
| 14 | 15 cc. methanol | 4.7 | whitish residue. |
| | Total | 51.1 | |

Finally, fractions 3-6 from the first chromatogram, fractions 4-9 of the second chromatogram and fractions 1-6 from the third chromatogram combined (75.5 mg.) are subjected to chromatographic adsorption in solution in a mixture of 15 cc. of benzene and 15 cc. of petroleum ether. The solution is filtered through a column of 3.7 g. of aluminum oxide (Brockmann), the original solution being passed through within one hour and the eluates each within 20–25 minutes, with the following results:

*Chromatographic fractionation IV*

| No. of Fraction | Solvent | Weight of Residue, mg. | Appearance of Residue |
|---|---|---|---|
| 1 | 15 cc. benzene+15 cc. petr. ether (original solution). | 1.9 | colorless grease. |
| 2 | 10 cc. benzene+10 cc. petr. ether | 10.9 | colorless sticky resin. |
| 3 | 12 cc. benzene+8 cc. petr. ether | 5.4 | colorless solid resin. |
| 4 | 14 cc. benzene+6 cc. petr. ether | 6.0 | Do. |
| 5 | 16 cc. benzene+4 cc. petr. ether | 5.7 | Do. |
| 6 | 18 cc. benzene+2 cc. petr. ether | 4.5 | Do. |
| 7 | 20 cc. benzene | 3.5 | Do. |
| 8 | do | 2.4 | Do. |
| 9 | do | 1.5 | Do. |
| 10 | 16 cc. benzene+4 cc. ether | 2.8 | Do. |
| 11 | 12 cc. benzene+8 cc. ether | 1.8 | Do. |
| 12 | 8 cc. benzene+12 cc. ether | 0.9 | Do. |
| 13 | 20 cc. ether | 1.6 | Do. |
| 14 | do | 1.6 | Do. |
| 15 | 15 cc. ether+5 cc. methanol | 11.5 | yellowish solid resin. |
| 16 | 20 cc. methanol | 7.4 | yellowish whitish glass. |
| | Total | 69.4 | |

Fractions 2–9 combined (39.9 mg.) from the chromatographic fractionation IV are subjected to distillation in a high vacuum. In effecting the distillation the oven is heated within 15 minutes to 170° C., is raised within 10 minutes to 230° C., and then within 30 minutes more to 250° C. The distillate, usually a light yellow, very viscous resin, comprises the compound H.

A solution of the product comprising compound H in methanol was found to reduce an alkaline solution of silver diammine after short standing at room temperature and analyses as follows:

Calculated for $C_{22}H_{30}O_4$: C, 73.69; H, 8.44. Found: C, 73.93; H, 8.30.

The compound is further characterized by its ultra-violet absorption spectrum:

$$\lambda_{max} = 238 \ m\mu; \ \epsilon = 14720$$

The compound I, an alcohol, will be prepared by hydrolysis of any of the compounds H, thus, by way of example, by hydrolysis of any of the compounds H where Y is an acyloxy group of 2–6 carbon atoms, preferably under mildly alkaline conditions using, for example, potassium bicarbonate.

By reference to the scheme illustrated in the drawing, it will be appreciated that from the broad standpoint this invention is not limited to the compound H, but, to the contrary, contemplates the various compounds having the structure of compound H except for the fact that they will have the grouping $COCH_2Y$ at carbon atom 17, where Y is a halogen group or an acyloxy group of 2–6 carbon atoms. The compounds having the grouping $COCH_2Y$ at carbon atom 17 will be prepared from compound G as described above for the preparation of compound H by use of the acid corresponding to the compound desired.

As specifically illustrative of the several compounds contemplated by this invention where Y is an acyloxy group of 2–6 carbon atoms, in addition to the acetate heretofore described, the propionate, the butyrate, the valerate and the caproate are specific examples.

The structure of the several compounds where Y is an acyloxy group of 2–6 carbon atoms will be specifically illustrated and thoroughly understood by reference to the accompanying scheme and the above description in which the acetate is disclosed as compound H. The specific structure of the other compounds above mentioned will be made completely apparent and the structure of the several compounds will be specifically illustrated by the substitution for Y in compound H of a propionic group, a butyric group, a valeric group and a caproic group, respectively.

The several compounds above specifically mentioned and specifically exemplified in the scheme will be prepared as heretofore described in connection with the preparation of 10-nor-11-desoxycorticosterone acetate by the use of propionic, butyric, valeric or caproic acid in place of acetic acid, with the production respectively of 10-nor-11-desoxycorticosterone propionate, 10-nor-11-desoxycorticosterone butyrate, 10-nor-11-desoxycorticosterone valerate and 10-nor-11-desoxycorticosterone caproate.

It will be understood, with reference to the several compounds illustrated and described above, that I do not intend that this invention or the claims appended hereto shall be limited to any particular configuration about any carbon atom and, in particular, about carbon atoms 3, 10, 14 and 17.

This application is a continuation-in-part of an application filed by me on March 24, 1945, Serial No. 584,624, now abandoned.

What I claim and desire to protect by Letters Patent is:

1. A compound having the following structure:

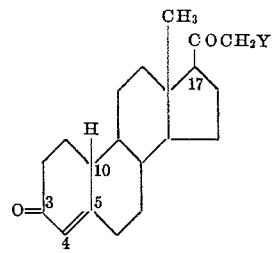

where Y is an acyloxy group selected from the group consisting of unsubstituted aliphatic acyloxy groups of 2–6 carbon atoms.

2. A compound having the structure:
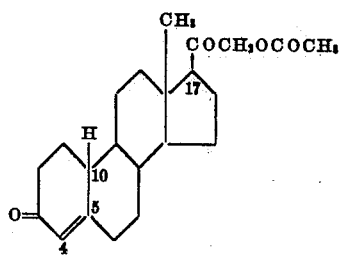
3. A compound having the structure:
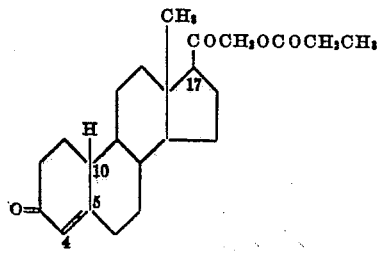
4. A compound having the structure:
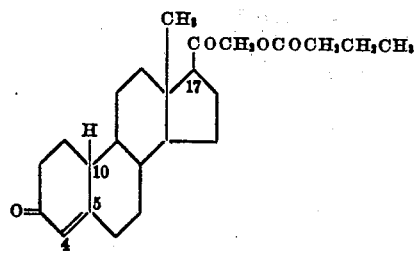
5. A compound having the structure:
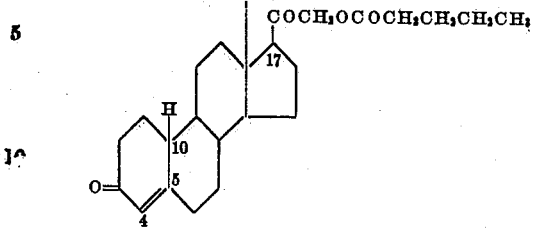
6. A compound having the structure:
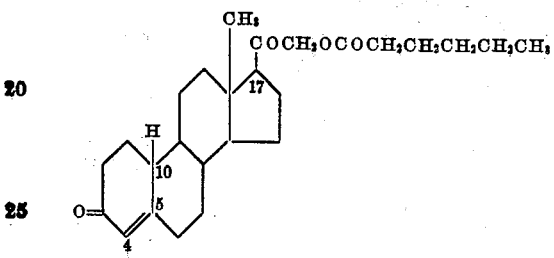
MAXIMILIAN R. EHRENSTEIN.
No references cited.